United States Patent Office 3,647,745
Patented Mar. 7, 1972

3,647,745
SEALING COMPOSITIONS CONTAINING PHOSPHORUS- AND METAL-CONTAINING ANTI-SAG AGENTS
Thomas Charles Jennings, Lyndhurst, Ohio, assignor to The Lubrizol Corporation, Wickliffe, Ohio
No Drawing. Continuation-in-part of application Ser. No. 739,956, May 8, 1968, which is a division of application Ser. No. 565,740, July 18, 1966, now Patent No. 3,470,222, which in turn is a continuation-in-part of application Ser. No. 493,240, Oct. 5, 1965. This application Apr. 20, 1970, Ser. No. 30,305
Int. Cl. C08f 45/62
U.S. Cl. 260—41 R
5 Claims

ABSTRACT OF THE DISCLOSURE

Phosphorus- and metal-containing compositions, prepared by reacting phosphoric acid with an organic epoxide and further reacting the intermediate thus formed with a metal base (especially zinc oxide), are useful as anti-sag agents in sealing compositions.

---

This application is a continuation-in-part of copending application Ser. No. 739,956, filed May 8, 1968, which is a division of application Ser. No. 565,740, filed July 18, 1966, now U.S. Pat. 3,470,222. The latter is a continuation-in-part of application Ser. No. 493,240, filed Oct. 5, 1965, now abandoned.

This invention relates to new compositions of matter and methods for their preparation. More particularly, it relates to compositions which are prepared by (1) reacting one mole of phosphoric acid with up to about 5 equivalents of an organic epoxide and (2) reacting the intermediate thus formed with about 0.4–2.0 equivalents of a metal base. In a preferred embodiment, the ratio of moles of phosphoric acid to equivalents of epoxide is about 1:1 and the ratio of moles of this product to equivalents of metal base is also about 1:1.

While the precise constitution of the products formed by this reaction sequence is not known, a study of the lierature relating to analogous reactions and of the chemical properties of the products, especially their neutralization numbers, has led to several conclusions. In the first place, the epoxide usually reacts as though it were a dimer. Thus, the initial stage in the reaction of phosphoric acid with propylene oxide may be represented as follows.

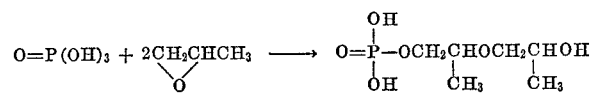

In the second place, the intermediate formed in the first step of the reaction sequence is a mixture of unreacted phosphoric acid and the mono-, di- and triesters thereof. The composition of this mixture has been determined for various molar ratios of epoxide to phosphoric acid, from the neutralization numbers of the product using bromphenol blue and phenolphthalein indicators. (The first of these is acidic and changes color after the first acidic hydrogen of phosphoric acid has been titrated; the second is moderately basic and changes color after titration of the second hydrogen.) These compositions are given in Table I.

TABLE I

| Molar ratio, epoxide: H₃PO₄ | Mole percent | | | |
| --- | --- | --- | --- | --- |
| | H₃PO₄ | Monoester | Diester | Triester |
| 1:1 | 67 | 22 | 5 | 6 |
| 2:1 | 44 | 29 | 10 | 17 |
| 3:1 | 28.5 | 25 | 14.5 | 32 |
| 4:1 | 14.5 | 18 | 20 | 47.5 |
| 5:1 | 3 | 11 | 19 | 67 |

In the third place, the reaction of the phosphoric acid-epoxide intermediate with the metal base frequently produces a product in which only a small amount of metal is incorporated in the composition. While a metal content of at least 5% is preferred, the percentage may be as low as about 0.2%.

Based on the findings described above, the present invention is still more specifically directed to compounds and mixtures of compounds of the general formula

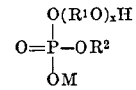

wherein $R^1$ is a substituted or unsubstituted ethylene radical; $R^2$ is hydrogen, a metal cation or $(R^1O)_xH$; M is one equivalent of a metal cation; and $x$ is an integer from 1 to about 5. The preferred compounds of this class are those having the formula

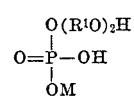

wherein $R^1$ and M are as defined above.

The preparation of the phosphorus- and metal-containing compositions of the present invention is effected in a two-step reaction, the first step being the formation of the phosphoric acid-epoxide intermediate and the second being its reaction with the metal base. For the first step, it is preferred to use concentrated phosphoric acid, typically 85% or greater and desirably about 100%. Phospholeum (phosphoric acid of greater than 100% concentration) is also suitable.

The term "epoxide," as used herein, refers to any compound containing at least one oxirane (oxacyclopropane) ring. The epoxide may also contain other functional groups, provided they do not interfere with the reaction of this invention and do not decompose under these reaction conditions. Thus, the epoxide may be an aliphatic one such as ethylene, propylene or butylene oxide; an aromatic one such as styrene, o-methylstyrene or p-chlorostyrene oxide; an ether such as allyl glycidyl ether, or a polymer thereof; an epoxy resin of the type which results from the reaction of epichlorohydrin with bisphenol A, said resin having terminal epoxy groups; or the like. The preferred epoxides are the aliphatic ones, especially propylene oxide. With reference to epoxides, the term "equivalent" is a number of grams or other weight units equal to the molecular weight of the epoxide divided by the number of epoxy groups per molecule.

The reaction between phosphoric acid and the epoxide is exothermic, and is best controlled by adding the epoxide gradually to the phosphoric acid. Ordinarily, no external heating is required; the reaction may be carried out starting at ambient temperatures and the temperature gradually increases during the epoxide addition until it reaches about 70–90° C. If the reaction is slow in starting at room temperature, external heat may be applied. The use of a solvent is ordinarily not necessary, but in certain instances solvents may be used. Ordinarily, up to about 5 equivalent and preferably about 1–2.5 equivalents of the epoxide is added per mole of phosphoric acid.

The second step of the process, in which the phosphoric acid-epoxide intermediate is reacted with a metal base, is preferably effected at a temperature between about 40° C. and 80° C. Suitable metal bases include, for example, the oxides, hydroxides, carbonates, bicarbonates, alkoxides, phenates, sulfides, and similar compounds. The most suitable metals are the alkaline earth and transition metals, especially zinc, magnesium, manganese, cadmium, aluminum, iron and tin; but alkali metals (especially lithium) may also be used. Zinc is the preferred metal. The metal base may be added to the reaction mixture all at once, or it may be added gradually so as to maintain more accurate control of the reaction rate and temperature. For each mole of phosphoric acid used in preparation of the epoxide-phosphoric acid intermediate, about 0.4–2.0 equivalents of metal base is used; preferably, the ratio of equivalents of metal base to moles of phosphoric acid is between about 0.8:1 and 1:1. The reaction may be effected in the presence or absence of a solvent, but solvents are preferably used, especially oxygenated organic compounds such as alcohols, ethers, ketones, ether alcohols and the like. Specific examples of suitable solvents are ethylene glycol monobutyl ether, 1-hexanol, 4-methyl-2-pentanol, diethylene glycol, dioxane, mixtures thereof with aromatic hydrocarbons such as toluene or xylene, and the like.

After the metal base has completely dissolved in the reaction mixture, it is preferred that water be removed by heating said mixture to about 110–180° C. Water removal may be promoted by reducing the pressure or purging the system with an inert gas such as nitrogen. While removal of water is preferred, it is not necessary; the mixture may often be used without removal of water. In most cases, however, insoluble residues in the reaction mixture should be removed by filtration or the like before use.

The following examples illustrate methods of preparation of the phosphorus- and metal-containing compositions of this invention.

EXAMPLE 1

To 2940 grams (30 moles) of 100% phosphoric acid is added, over 2½ hours, 1740 grams (30 moles) of propylene oxide. The temperature rises to 50° C. as the propylene oxide addition is commenced and is held to 50–60° C. during the addition by means of a cold water bath. After the addition of the propylene oxide, the mixture is heated for one-half hour at 65–70° C.

To 2340 grams of the propylene oxide-phosphoric acid intermediate thus prepared, at 60° C., is added 610 grams (15 equivalent) of zinc oxide over one-half hour. The temperature rises to 115° C. during the zinc oxide addition. The mixture is heated to 128–138° C. and purged with nitrogen for six hours. During this period, water is evolved from the reaction mixture; the total amount of water recovered is 133 ml. After water removal is complete, 1875 grams of ethylene glycol monobutyl ether is added over ten minutes. The mixture is stirred for 15 minutes and allowed to stand overnight. Finally, filter aid (2% by weight) is added and the solution is filtered.

The product is a 60% ethylene glycol monobutyl ether solution of the compound having a propylene oxide (moles): phosphoric acid (moles): zinc oxide (equivalents) ratio of 1.0:1.0:0.5; it contains 10.6% zinc and 10.1% phosphorus.

EXAMPLE 2

A 50% solution in ethylene glycol monobutyl ether of a propylene oxide-phosphoric acid-zinc oxide reaction product is prepared according to the method of Example 1, except that water is not removed and the maximum temperature of the reaction mixture is 67° C. After the addition of the salt, the mixture is stirred at 67° C. for six hours in order to complete dissolution of the zinc oxide. The product contains 8.45% zinc and 7.53% phosphorus, and becomes hazy on standing.

EXAMPLE 3

A solution of 780 grams (5.0 moles) of 1:1 propylene oxide-phosphoric acid intermediate, prepared according to the method described in Example 1, in 939 grams of 1-hexanol is heated to 50° C. and 204 grams (5.0 equivalents) of zinc oxide is added over a 5-minute period. The solution is heated at 130° C. (reflux temperature) for 20 minutes and the water evolved (29 ml.) is collected in a trap. After the water has been removed, filter aid (3% by weight) is added to the solution which is then cooled and filtered. The product is obtained as a 50% solution in 1-hexanol; it has a zinc content of 7.95% and a phosphorus content of 8.20%.

EXAMPLE 4

The procedure of Example 3 is repeated, except that the ratio of moles of the propylene oxide-phosphoric acid intermediate to equivalents of zinc oxide is 1:0.91 and the solvent is 4-methyl-2-pentanol, which is present in an amount sufficient to form a 50% solution of the product.

EXAMPLE 5

Eight hundred grams of the product of Example 4 and 400 grams of diethylene glycol are mixed and heated for two hours at 145° C., while purging with nitrogen. The 4-methyl-2-pentanol is removed by evaporation and the residue is the desired 50% solution of the product in diethylene glycol.

EXAMPLE 6

A solution of 163 grams (4.0 equivalents) of zinc oxide in 415 grams of a 4:1 (by weight) mixture of 1-hexanol and toluene is heated to 50° C., and a solution of 624 grams (4.0 moles) of a 1:1 propylene oxide-phosphoric acid intermediate in 336 grams of the 1-hexanol-toluene solvent is added over one hour, with stirring. The reaction mixture is heated to 115–130° C. and purged with nitrogen, 36 ml. of water being thus removed. It is then cooled to 100° C., and 30 grams of filter aid is added. The mixture is further cooled to 80° C. and filtered. There is obtained a 50% solution of the reaction product which contains 8.65% zinc and 7.69% phosphorus.

EXAMPLE 7

The procedure of Example 6 is repeated, except that the solvent is diethylene glycol. A 50% solution of the product is obtained.

EXAMPLE 8

To 980 grams (10.0 moles) of 100% phosphoric acid, at 50–60° C., is added 580 grams (10.0 moles) of propylene oxide. The mixture is stirred for one hour, after, which 1810 grams of 4-methyl-2-pentanol is added. The solution is then heated to 55° C. and 342 grams (9.64 equivalents) of zinc oxide is added over ten minutes. The reaction mixture is heated to 110–128° C. and purged with nitrogen for three hours; 68 ml. of water is thus recovered by distillation. After standing overnight, the mixture is heated to 128° C. and purged for an additional two hours with nitrogen; an additional 19 ml. of water is thus obtained. The mixture is then cooled and filtered (with the addition of 2% filter aid). The product, a 50% solution in 4-methyl-2-pentanol, contains 7.70% zinc and 8.30% phosphorus.

EXAMPLE 9

Following the procedure of Example 3, a propylene oxide-phosphoric acid-zinc oxide adduct is made from 490 grams (5.0 moles) of phosphoric acid, 218 grams (3.75 moles) of propylene oxide, 204 grams (5.0 equivalents) of zinc oxide and 867 grams of 1-hexanol. The product, a 50% solution in 1-hexanol, contains 8.21% zinc and 8.62% phosphorus.

EXAMPLE 10

Following the procedure of Example 1, a reaction product is prepared from 3.0 moles of propylene oxide, 3.0 moles of phosphoric acid, 7.5 equivalents of zinc oxide and 785 grams of ethylene glycol monobutyl ether. The product, a 60% solution in ethylene glycol monobutyl ether, contains 9.25% zinc and 8.95% phosphorus.

EXAMPLE 11

A propylene oxide-phosphoric acid intermediate with a 1.5:1 molar ratio of propylene oxide to phosphoric acid is prepared by a method similar to that described in Example 1. To a solution of 925 grams (5.0 moles) of this intermediate in 925 grams of 1-hexanol is added 204 grams (5.0 equivalents) of zinc oxide. The addition takes place over a ten-minute period during which the temperature rises to 40° C. The mixture is then heated to 133–154° C. for one hour, during which time 45 grams of water is removed by distillation. An additional 45 grams of 1-hexanol is then added and the material is filtered. There is obtained a 55% solution in 1-hexanol of the reaction product which contains 7.10% phosphorus and 6.44% zinc.

EXAMPLE 12

Following the procedure of Example 1, a 3:1 propylene oxide-phosphoric acid intermediate is prepared. A solution of two moles of this intermediate in 607 grams of 4-methyl-2-pentanol is reacted with one mole of zinc oxide according to the procedure described in the previous examples. The product, a 50% solution in 4-methyl-2-pentanol, contains 5.22% zinc and 4.95% phosphorus.

EXAMPLE 13

A 5:1 propylene oxide-phosphoric acid intermediate is prepared by substantially the method described in Example 1. To a solution of 1.0 mole of this intermediate in 420 grams of isohexanol is added 1.0 equivalent of zinc oxide, according to the procedure described in previous examples. The product, a 50% solution in isohexanol, contains 2.13% zinc and 2.82% phosphorus.

EXAMPLE 14

A 1:1 allyl glycidyl ether-phosphoric acid intermediate is prepared by the method of Example 1. To a solution of 424 grams (2.0 moles) of this intermediate in 487 grams of 1-hexanol is added 81 grams (2.0 equivalents) of zinc oxide at 50° C. over 15 minutes. The mixture is heated to 140° C. and purged with nitrogen to remove water, and is then cooled and filtered. The product, a 50% solution in 1-hexanol, contains 5.68% zinc and 5.8% phosphorus.

EXAMPLE 15

Twelve hundred grams (2.0 moles) of a 75% solution, in a 2:1 (by weight) mixture of methyl isobutyl ketone and xylene, of a bisphenol A-epichlorohydrin condensation product of molecular weight about 450 is diluted with 860 grams of isohexyl alcohol. The solution is heated to 50° C., and 196 grams (2.0 moles) of 100% phosphoric acid is added over 20 minutes, followed by 82 grams (2.0 equivalents) of zinc oxide. The mixture is heated for two hours at 110–127° C. to remove water, after which it is cooled and filtered. The resulting 50% solution contains 1.87% zinc and 2.46% phosphorus.

EXAMPLE 16

Following the procedure of Example 1, a reaction product is prepared from 780 grams (5.0 moles) of a 1:1 propylene oxide-phosphoric acid intermediate, 320 grams (5.0 equivalents) of cadmium oxide, and 1055 grams of ethylene glycol monobutyl ether. The product, a 50% solution in ethylene glycol monobutyl ether, contains, 4.70% phosphorus and 0.58% cadmium.

EXAMPLE 17

A solution of 625 grams (4.0 moles) of a 1:1 propylene oxide-phosphoric acid intermediate in 668 grams of isohexanol is heated to 50° C. and 81 grams (4.0 equivalents) of magnesium oxide is added. The mixture is heated to 120° C. and a current of nitrogen is passed through to remove water; than 200 grams of xylene is added. The solution is cooled and filtered, yielding a 43% solution of a magnesium oxide-propylene oxide-phosphoric acid reaction product containing 0.28% magnesium and 6.28% phosphorus.

EXAMPLE 18

To a solution of 624 grams (4.0 moles) of a 1:1 propylene oxide-phosphoric acid intermediate in 564 grams of 4-methyl-2-pentanol and 550 grams of 2-methylpentanol is added 151 grams (3.28 equivalents) of manganous oxide, at 50–52° C. The product is purged with nitrogen at 125–138° C. to remove water, and filtered; the product contains 0.575% manganese and 5.00% phosphorus. It is obtained as a 40% solution.

EXAMPLE 19

A solution of 428 grams (2.0 moles) of a 2:1 propylene oxide-phosphoric acid intermediate in 520 grams of dioxane is heated to 50° C., and 92 grams (2.0 equivalents) of manganous oxide is added. The mixture is heated under reflux at 100° C. for about 1½ hours, after which time 115 grams of dioxane is added. After another hour of refluxing, an additional 145 grams of dioxane is added. Finally, the solution is filtered with the addition of 2% by weight of filter aid. The product, a 40% solution in dioxane, has a manganese content of 4.22% and a phosphorus content of 5.09%.

EXAMPLE 20

A solution of 642 grams (3.0 moles) of a 2:1 propylene oxide-phosphoric acid intermediate is dissolved in 697 grams of isohexanol and the solution is heated to 50° C. Manganous oxide, 69 grams (1.5 equivalents), is added and the mixture is heated to 120° C. and purged with nitrogen to remove water. Finally, the mixture is cooled and filtered (with the addition of 2% by weight of filter aid), yielding a product containing 2.86% manganese and 7.31% phosphorus.

EXAMPLE 21

A solution of 624 grams (4 moles) of a 1:1 propylene oxide-phosphoric acid intermediate in 490 grams of 1-hexanol is heated to 40° C. and 230 grams (4 equivalents) of manganous carbonate is added slowly over 1¼ hours as the temperature is increased to 60° C. After the addition of manganous carbonate is complete, the mixture is heated to 70° C. until gas evolution ceases. There is obtained a viscous material (60% solution in 1-hexanol) containing 5.50% manganese and 10.55% phosphorus.

EXAMPLE 22

A 1:1 propylene oxide-phosphoric acid intermediate is prepared according to the method described in Example 4, from 392 grams (4.0 moles) of phosphoric acid and 232 grams (4.0 moles) of propylene oxide. Ferric oxide, 160 grams (3 equivalents), is added at a temperature of 50° C., the mixture is blown with nitrogen at 50–130° C. to remove water and is filtered (with the addition of 3% filter aid). The product has an iron content of 3.76% and a phosphorus content of 8.43%.

EXAMPLE 23

A propylene oxide-phosphoric acid-stannous oxide reaction product is prepared by a method similar to that described in Example 9 and 2 moles of propylene oxide, 2 moles of phosphoric acid and 2 equivalents of stannous oxide. The solvent is 1-hexanol (429 grams). The product, a 50% solution, contains 0.76% tin and 5.79% phosphorus.

EXAMPLE 24

Zinc sulfide, 146 grams (3.0 equivalents) is added to a solution of 468 grams (3.0 moles) of a 1:1 propylene oxide-phosphoric acid intermediate in 563 grams of 4-methyl-2-pentanol at a temperature of 65–85° C. The reaction mixture is heated at about 130° C. for 1½ hours, the evolved hydrogen sulfide being collected by absorption in a caustic solution. It is then purged with nitrogen for 1½ hours at 125° C.; nitrogen purging is continued for an additional hour as the temperature is decreased to 85° C. The solution is treated with 3% by weight of filter aid and filtered. The product is a clear, yellow fluid (50% solution in 4-methyl-2-pentanol) of the zinc phosphorus compound containing 1.36% zinc and 9.20% phosphorus.

EXAMPLE 25

Following the procedure of the above examples, a lithium hydroxide-propylene oxide-phosphoric acid reaction product is prepared from 168 grams (4.0 equivalents) of lithium hydroxide and 624 grams (4.0 moles) of a 1:1 propylene oxide-phosphoric acid reaction product in 648 grams of 1-hexanol. After filtration, the product is obtained as a clear golden fluid (50% in 1-hexanol) containing 0.327% lithium and 5.25% phosphorus.

EXAMPLE 26

Aluminum isopropoxide, 136 grams (2.0 equivalents) is reacted with a solution of 372 grams (2.0 moles) of a 1.5:1 propylene oxide-phosphoric acid intermediate in 270 grams of 1-hexanol. The reaction is carried out at 60–65° C. for 3 hours, after which the reaction product is filtered through filter cloth. There is obtained a 50% solution which contains 1.33% aluminum and 8.27% phosphorus.

EXAMPLE 27

Following the procedure of the foregoing examples, 740 grams (4.0 moles) of a 1.5:1 propylene oxide-phosphoric acid intermediate is reacted with 112 grams (4.0 equivalents) of calcium oxide in 1816 grams of 1-hexanol at 152° C. Upon filtration, there is obtained a milky liquid of low viscosity (50% in 1-hexanol) containing 2.85% calcium and 6.80% phosphorus.

EXAMPLE 28

A 1:1 styrene oxide-phosphoric acid intermediate is prepared as in Example 1. Zinc oxide, 82 grams (2.0 equivalents), is added over 15 minutes to a solution of 436 grams (2.0 moles) of this reaction product in 500 grams of 1-hexanol, at 50–62° C. Water formed in the reaction is removed by distillation under nitrogen at 70–120° C.

The residue from the distillation is filtered to remove a milky white solid which is apparently predominantly $ZnHPO_4$. The filtrate (yield 815 grams), contains 1.98% zinc and 4.74% phosphorus.

The phosphorus and metal-containing compositions of the present invention, especially those prepared from zinc oxide and propylene oxide, are excellent thixotropic agents, especially for use as anti-sag additives in plastic caulking and sealing materials and the like. There are a wide variety of such materials, and the formulations of many of them are carefully guarded trade secrets. In general, however, they contain as essential ingredients a resinous binder, which may be a natural resin such as butyl rubber or a synthetic resin such as polyvinyl chloride, polybutenes, polysulfides, epoxy resins, polyurethanes, silicones or alkyl acrylate polymers, and a solid filler such as calcium carbonate, magnesium silicate, asbestos, talc or the like, the weight ratio of filler to binder usually being between about 1:4 and 4:1 and preferably between about 1:1 and 4:1. Other ingredients may include tackifiers and adhesion improvers such as polyisobutene, phenolic resins, solid hydrocarbon resins and the like; hiding pigments such as carbon black and titanium dioxide; curing catalysts or accelerators such as lead dioxide and cobalt naphthenate; plasticizers such as dioctyl phthalate, chlorinated paraffins, esters of rosin or hydrogenated rosin, and the like; and curing retarders such as stearic acid. Ideally, these sealants should be thixotropic; that is, they should be viscous and resistant to flow under low shear conditions but should flow readily when subjected to high shear such as by rapid passage through a caulking gun. After application to the area being sealed, the composition should cure to a rubbery substance which remains in place but "gives" with a certain amount of flexibility when deformed.

Many sealing compositions containing the ingredients listed hereinabove have the desired thixotropic properties but "sag" when applied. That is, they have liquid-like properties and tend to "run" instead of remaining in place. To avoid this disadvantage, it is usually necessary to add an anti-sag material. Most of the materials suitable for this purpose are solids such a bentonite. While these solids have excellent anti-sag properties, they are not as convenient to measure into the formultion as are liquids. Therefore, it was unexpected and commercially significant to discover that the compositions of this invention, when present in minor amounts between about 0.25% and 25% (preferably about 0.25–5%) of the weight of the composition and most conveniently about 1.5–30% of the weight of the binder resin, impart excellent anti-sag properties thereto. They are particularly useful in butyl rubber and acrylic sealants.

Table II gives illustrative examples of the sealing compositions of this invention. Examples F and G are controls presented for comparison in common tests.

TABLE II

| Example | Parts by weight of— | | | | | | |
|---|---|---|---|---|---|---|---|
| | A | B | C | D | E | F[1] | G[1] |
| Ingredient: | | | | | | | |
| Butyl rubber | 50 | 50 | 50 | 50 | | 50 | |
| Terpolymer of n-butyl acrylate (about 76%), methylacrylate (about 21%) and acrylonitrile (about 3%) | | | | | 83 | | 83 |
| Calcium carbonate | 103 | 103 | 103 | 103 | 72.2 | 103 | 72.2 |
| Magnesium silicate | 25.8 | 25.8 | 25.8 | 25.8 | | 25.8 | |
| Asbestos | | | | | 3.1 | | 3.1 |
| Talc | | | | | 17.5 | | 17.5 |
| Titanium dioxide | 13 | 13 | 13 | 13 | | 13 | |
| Hydrocarbon resin | 11.4 | 11.4 | 11.4 | 11.4 | | 11.4 | |
| Ethylene glycol | | | | | 2.6 | | 2.6 |
| Hydrogenated rosin ester | 2.2 | 2.2 | 2.2 | 2.2 | | 2.2 | |
| Pine oil | | | | | 1.1 | | 1.1 |
| Stoddard solvent | 72.3 | 72.3 | 72.3 | 72.3 | | 72.3 | |
| Xylene | | | | | 29.3 | | 29.3 |
| Product of Example: | | | | | | | |
| 4 | 10 | | | | | | |
| 5 | | 5 | | | | | |
| 7 | | | 5 | 2.5 | 2.8 | | |

[1] Control.

The viscosity and thixotropic properties of the butyl rubber sealing compositions of Examples A–D and F were tested by the Severs viscosity method, which involves pumping the composition through an orifice with a diameter of approximately 0.625 cm. at various pressures for various time periods. To be satisfactory as sealants, the compositions should have low efflux periods at low pressures and high periods at high pressures.

The "sag" properties of the butyl rubber sealing compositions were evaluated by applying each composition to a metal plate through a plywood mold ¾ inch thick and containing a 1" x 4" rectangular opening. After application, the mold was immediately removed and the panel was suspended in a vertical position overnight and allowed to dry. A noticeable "sag" developed almost immediately, but the extent of further sag varied with the various compositions being treated. After standing overnight, the amount of sag in inches was measured.

The results of these tests are given in Table III.

TABLE III

| Example: | "Sag," inches | Average efflux time, grams/10 seconds | | | |
|---|---|---|---|---|---|
| | | 10 p.s.i. | 40 p.s.i. | 70 p.s.i. | 100 p.s.i. |
| A | ¾ | 0.10 | 1.31 | 4.77 | 13.56 |
| B | ⅛ | 0.08 | 1.47 | 5.26 | 14.9 |
| C | ½ | 0.03 | 0.73 | 3.02 | 9.0 |
| D | ½ | 0.04 | 0.92 | 3.89 | 10.85 |
| F¹ | (²) | 0.09 | 1.10 | 3.97 | 10.58 |

¹ Control.
² Flowed off.

The "sag" properties of the acrylic sealing compositions of Examples E and G were compared by pouring each of the sealants into an aluminum channel, 6″ x ¾″ x ½″, with a 2-inch tongue, and suspeding the channels in a vertical position for one hour at 122° F. At the end of this period, the composition of Example E had virtually no sag, while that of Example G had almost completely run out of the channel.

The comparative extrudability of the acrylic sealants was evaluated by pumping six fluid ounces of the sealant from a cartridge, under 50 p.s.i. pressure. It was found that at 60° C., the time required to extrude 6 ounces of the compoistion of Example E was about 100 seconds, while the time required for the composition of Example G was about 650 seconds. At higher temperatures, the composition of Example E likewise required less pumping time. Similar results were noted when the sealing compositions were diluted to 85% total solids with xylene and similarly extruded.

What is claimed is:

1. A sealing composition comprising a resinous binder, a solid filler and about 0.25–25% by weight of a metal-containing composition prepared by (1) reacting one mole of phosphoric acid with up to about 5 equivalents of an organic epoxide, and (2) reacting the intermediate thus formed with about 0.4–2.0 equivalents of a metal base.

2. A sealing composition according to claim 1 wherein the epoxide is propylene oxide.

3. A sealing composition according to claim 1 wherein the metal is zinc.

4. A sealing compoistion according to claim 3 wherein the binder is butyl rubber or a poly-(alkyl acrylate).

5. A sealing composition according to claim 4 wherein the metal-containing composition is prepared by reacting one mole of phosphoric acid with about 1–2.5 equivalents of propylene oxide, and thereafter reacting the intermediate thus formed with about 0.8–1.0 equivalent of zinc oxide.

References Cited

UNITED STATES PATENTS

| 3,256,227 | 7/1966 | Kraus | 260—3.7 |
| 3,350,380 | 10/1967 | Strobel | 260—94.7 |
| 3,468,678 | 9/1969 | Clampitt | 106—15 |
| 3,470,222 | 9/1969 | Jennings | 260—429.9 |
| 3,488,368 | 1/1970 | Spivack | 260—429.7 |

MORRIS LIEBMAN, Primary Examiner

R. H. ZAITLEN, Assistant Examiner

U.S. Cl. X.R.

260—23.7 M, 45.7 B, 46.7 D